United States Patent
Leme et al.

(10) Patent No.: US 11,314,933 B2
(45) Date of Patent: Apr. 26, 2022

(54) CUSTOMIZED USER PROMPTS FOR AUTOFILLING APPLICATIONS

(71) Applicant: Google LLC, Mountain View, CA (US)

(72) Inventors: Felipe Leme, Belmont, CA (US); Svetoslav Ganov, San Francisco, CA (US); Jason Long, Mountain View, CA (US)

(73) Assignee: Google LLC, Mountain View, CA (US)

( * ) Notice: Subject to any disclaimer, the term of this patent is extended or adjusted under 35 U.S.C. 154(b) by 45 days.

(21) Appl. No.: 16/608,372

(22) PCT Filed: Oct. 23, 2018

(86) PCT No.: PCT/US2018/057122
§ 371 (c)(1),
(2) Date: Oct. 25, 2019

(87) PCT Pub. No.: WO2019/084017
PCT Pub. Date: May 2, 2019

(65) Prior Publication Data
US 2021/0110104 A1    Apr. 15, 2021

Related U.S. Application Data

(60) Provisional application No. 62/576,480, filed on Oct. 24, 2017.

(51) Int. Cl.
*G06F 40/174*    (2020.01)
*G06F 40/186*    (2020.01)

(52) U.S. Cl.
CPC .......... *G06F 40/174* (2020.01); *G06F 40/186* (2020.01)

(58) Field of Classification Search
CPC .................. G06F 40/174; G06F 40/186
(Continued)

(56) References Cited

U.S. PATENT DOCUMENTS 5,987,440 A * 11/1999 O'Neil ................ G06Q 10/10
705/39
8,214,362 B1    7/2012 Djabarov
(Continued)

OTHER PUBLICATIONS

How to secure your passwords with LastPass; Mar. 22, 2014; gettingthingstech.com; pp. 1-13.*
(Continued)

*Primary Examiner* — Andrew R Dyer
(74) *Attorney, Agent, or Firm* — McDonnell Boehnen Hulbert & Berghoff LLP

(57) ABSTRACT

An example method includes determining a subset of content displayed by an application on a user interface (UI) of a user device, wherein the subset excludes user-specific information. The method further includes transmitting a request to a remote provider for at least one template for use with the application, wherein the request comprises the subset of content displayed on the UI. The method also includes receiving a response to the request from the remote provider, wherein the response comprises the at least one template indicating how to process user input data in one or more text input fields displayed by the application on the UI, and generating a prompt to authorize transmission of the one or more user input values to the remote provider for future use in autofill, wherein the prompt is customized by processing the one or more user input values using the at least one template.

19 Claims, 8 Drawing Sheets

(58) Field of Classification Search
USPC .......................................................... 715/226
See application file for complete search history.

(56) References Cited

U.S. PATENT DOCUMENTS

| | | | | |
|---|---|---|---|---|
| 8,561,185 | B1* | 10/2013 | Muthusrinivasan | ........................ G06F 21/6245 726/22 |
| 8,751,535 | B1* | 6/2014 | Kim | ...................... G06F 16/435 707/784 |
| RE45,371 | E * | 2/2015 | Simons | ............... G06F 16/9535 715/224 |
| 9,292,484 | B1 | 3/2016 | Plow | |
| 9,753,898 | B1* | 9/2017 | Glommen | ............. G06F 40/117 |
| 9,842,097 | B2* | 12/2017 | Selig | ...................... G06F 40/174 |
| 9,972,005 | B2* | 5/2018 | Wong | ................... G06Q 20/322 |
| 10,043,185 | B2* | 8/2018 | Van Os | ............. H04M 1/72445 |
| 10,169,321 | B2* | 1/2019 | Trivedi | ................. G06F 40/221 |
| 10,187,363 | B2* | 1/2019 | Smirnoff | ............... H04L 9/0822 |
| 10,438,205 | B2* | 10/2019 | Van Os | ............. G06Q 20/4014 |
| 10,484,384 | B2* | 11/2019 | Cotterill | ................... H04L 63/08 |
| 10,664,558 | B2* | 5/2020 | Mahamood | ........... G06F 40/186 |
| 10,776,571 | B2* | 9/2020 | Meschkat | .......... G06Q 30/0633 |
| 10,796,084 | B2* | 10/2020 | Wang | ..................... G06F 40/174 |
| 10,839,147 | B1* | 11/2020 | Chernov | ............. G06F 16/9574 |
| 10,846,694 | B2* | 11/2020 | Wong | ................... H04L 9/3234 |
| 10,896,385 | B2* | 1/2021 | Thapliyal | ............... G06N 20/00 |
| 10,902,424 | B2* | 1/2021 | Van Os | ............. H04M 1/72445 |
| 2006/0184539 | A1* | 8/2006 | Blake | ................... G06F 40/174 |
| 2006/0271581 | A1* | 11/2006 | Sanjar | ................... G06F 40/143 |
| 2007/0143241 | A1* | 6/2007 | Israel | ..................... G06Q 10/06 |
| 2009/0094508 | A1* | 4/2009 | Kanzaki | ................ G06F 40/186 715/201 |
| 2009/0183117 | A1* | 7/2009 | Chang | .................. G06F 16/168 715/810 |
| 2010/0040286 | A1* | 2/2010 | Matsuzawa | ........... G06F 40/103 382/173 |
| 2010/0241736 | A1* | 9/2010 | Anka | ...................... H04L 51/00 709/219 |
| 2012/0036081 | A1* | 2/2012 | Hatter | ................... H04L 9/3247 705/321 |
| 2013/0104022 | A1* | 4/2013 | Coon | .................... G06F 40/174 715/226 |
| 2013/0111217 | A1* | 5/2013 | Kopasz | ................. H04L 9/3006 713/189 |
| 2013/0198598 | A1* | 8/2013 | Kirsch | .................. G06F 40/174 715/226 |
| 2013/0268437 | A1* | 10/2013 | Desai | ..................... G06Q 20/08 705/41 |
| 2013/0276103 | A1* | 10/2013 | Rautenbach | ............ G06F 21/31 726/19 |
| 2014/0258828 | A1 | 9/2014 | Lymer | |
| 2015/0205776 | A1 | 7/2015 | Bhatia | |
| 2015/0348029 | A1* | 12/2015 | Van Os | ................. G06Q 20/405 705/44 |
| 2016/0231915 | A1* | 8/2016 | Nhan | .................... G06F 16/904 |
| 2016/0294748 | A1* | 10/2016 | Yang | ...................... G06Q 50/01 |
| 2017/0083694 | A1* | 3/2017 | Mardikar | ................ G06F 21/32 |
| 2017/0132200 | A1* | 5/2017 | Noland | ................. G06F 40/186 |
| 2017/0287035 | A1* | 10/2017 | Barday | ................ G06Q 50/265 |
| 2018/0121881 | A1* | 5/2018 | Kumar | ................. G06F 3/04842 |
| 2018/0295135 | A1* | 10/2018 | Feijoo | ..................... H04L 63/10 |
| 2018/0358113 | A1* | 12/2018 | Cronin | .................. G16H 40/63 |
| 2018/0365334 | A1* | 12/2018 | Semlani | ................ G06F 40/295 |
| 2019/0020646 | A1* | 1/2019 | Magyar | ................... G06F 21/41 |
| 2019/0286711 | A1* | 9/2019 | Terry | ................... G06F 40/295 |
| 2019/0340201 | A1* | 11/2019 | Havens | ................... G06F 40/30 |
| 2020/0259825 | A1* | 8/2020 | Van Prooijen | ...... H04L 63/0861 |

OTHER PUBLICATIONS

Skye Hudson; Blur Can Hide Your Credit Cards, Emails, And More; Feb. 23, 2016; Makeuseof.com; pp. 1-23.*
Regular Expression; Aug. 19, 2013; Techterms.com; p. 1.*

* cited by examiner

CUSTOMIZED USER PROMPTS FOR AUTOFILLING APPLICATIONS

CROSS REFERENCE TO RELATED APPLICATION

The present application is a national stage entry of, and claims the benefit of, International (PCT) Application No. PCT/US2018/057122, filed on Oct. 23, 2018, which claims priority to U.S. Provisional Application No. 62/576,480, filed on Oct. 24, 2017, the contents of each of which are incorporated herein by reference in their entirety.

BACKGROUND

Many modern computing devices, including mobile devices, mobile phones, personal computers, and tablets, provide user interfaces (UIs) for permitting users to interact with the computing device. For example, application programs can use the UI to communicate with a user using images, text, and graphical elements such as windows, dialogs, pop-ups, images, buttons, scrollbars, and icons. The UI can also receive inputs from devices such as touch screens, a presence-sensitive display, computer mice, keyboards, and other devices to permit the user to control the UI, and thus the application program.

In some cases, the UI can be used to interact with an operating system to manage the computing device. For example, the operating system can have a control panel or setting application that uses the UI to draw one or more windows related to control settings for some aspect(s) of the computing device, such as audio controls, video outputs, computer memory, and human language(s) used by the operating system (e.g., choose to receive information in English, French, Mandarin, Hindi, Russian, etc.). The control panel/settings application can receive subsequent input related to the window(s) using the UI. The UI can provide the inputs to the operating system, via the control panel/settings application, to manage the computing device.

However, manually entering data into a UI can be inconvenient, slow and/or cumbersome for users or may generate errors, especially on mobile devices that may have a small UI.

SUMMARY

Example embodiments relate to a system that allows an operating system of a user device to intelligently prompt a user to save data for future autofill uses across multiple applications with the help of a remote provider without analyzing or storing the user-inputted data on the user device. More specifically, realizing that the user may input sensitive or confidential information, the operating system of a user device instead may determine a subset of content displayed by an application on a user interface (UI) of the user device that excludes information specific to that user. Then, in a further aspect, the operating system may use this subset of content to generate and transmit a request to a remote provider for at least one template to be used with the application. Additionally, based on this request, the operating system may receive a response from the remote provider that contains at least one template indicating how to process user input data inputted into one or more text input fields displayed by the application on the UI. Furthermore, the operating system may also receive one or more user input values in the one or more text input fields and generate a prompt to authorize transmission of the one or more user input values to the remote provider for future use in autofill, wherein the prompt is customized by processing the one or more user input values using the at least one template.

In one aspect, a method is provided that includes determining a subset of content displayed by an application on a user interface (UI) of a user device, wherein the subset excludes user-specific information. The method further includes transmitting a request to a remote provider for at least one template for use with the application, wherein the request comprises the subset of content displayed on the UI. The method also includes receiving a response to the request from the remote provider, wherein the response comprises the at least one template indicating how to process user input data in one or more text input fields displayed by the application on the UI. The method additionally includes receiving one or more user input values in the one or more text input fields. The method further includes generating a prompt to authorize transmission of the one or more user input values to the remote provider for future use in autofill, wherein the prompt is customized by processing the one or more user input values using the at least one template.

In another aspect, a user device is provided. The user device includes a UI and an operating system configured to determine a subset of content displayed by an application on the UI of the user device, wherein the subset excludes user-specific information. The operating system is further configured to transmit a request to a remote provider for at least one template for use with the application, wherein the request comprises the subset of content displayed on the UI. The operating system is also configured to receive a response to the request from the remote provider, wherein the response comprises the at least one template indicating how to process user input data in one or more text input fields displayed by the application on the UI. The operating system is additionally configured to receive one or more user input values in the one or more text input fields. The operating system is further configured to generate a prompt to authorize transmission of the one or more user input values to the remote provider for future use in autofill, where the prompt is customized by processing the one or more user input values using the at least one template.

In another aspect, a non-transitory computer readable medium is provided having stored therein instructions executable by one or more processors to cause an operating system of a user device to perform functions. The functions include determining a subset of content displayed by an application on a user interface (UI) of a user device, wherein the subset excludes user-specific information. These functions also include transmitting a request to a remote provider for at least one template for use with the application, wherein the request comprises the subset of content displayed on the UI. These functions additionally include receiving a response to the request from the remote provider, wherein the response comprises the at least one template indicating how to process user input data in one or more text input fields displayed by the application on the UI. These functions also include receiving one or more user input values in the one or more text input fields. These functions further include generating a prompt to authorize transmission of the one or more user input values to the remote provider for future use in autofill, wherein the prompt is customized by processing the one or more user input values using the at least one template.

In another aspect, a system is provided that includes a UI, at least one computer processor, and a non-transitory computer readable medium having stored therein instructions (that when executed by the at least one processor, cause the at least one processor to perform functions). The system includes means for determining a subset of content displayed by an application on a user interface (UI) of a user device, wherein the subset excludes user-specific information. The system also includes means for transmitting a request to a remote provider for at least one template for use with the application, wherein the request comprises the subset of content displayed on the UI. The system further includes means for receiving a response to the request from the remote provider, wherein the response comprises the at least one template indicating how to process user input data in one or more text input fields displayed by the application on the UI. The system additionally includes means for receiving one or more user input values in the one or more text input fields. The system also includes means for generating a prompt to authorize transmission of the one or more user input values to the remote provider for future use in autofill, wherein the prompt is customized by processing the one or more user input values using the at least one template.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
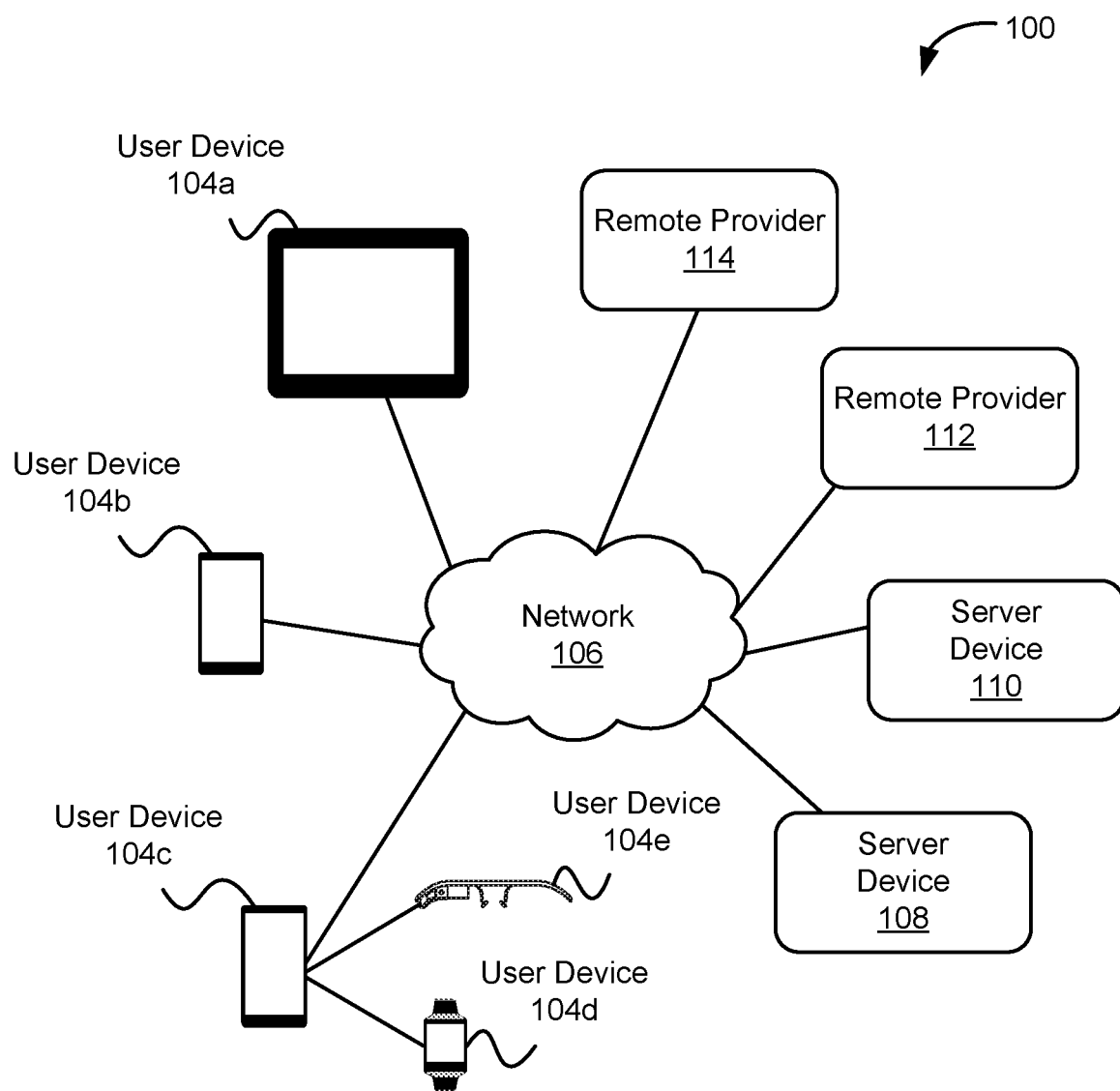
FIG. 1 depicts a distributed computing architecture, in accordance with example embodiments.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

It will be readily understood that the aspects of the present disclosure, as generally described herein, and illustrated in the Figures, can be arranged, substituted, combined, separated, and designed in a wide variety of different configurations, all of which are contemplated herein.

I. Overview

User devices, including mobile devices, mobile phones, personal computers, and tablets, are ubiquitous in modern communication networks. Many of these devices are capable of running one or more applications while facilitating communication within such networks. Further, many of these devices also provide one or more UIs for permitting users to interact with the user device.

For example, a user may use a UI to communicate information to be used by an application on the user device through the use of images, text, and other graphical elements. The UI can also receive inputs from numerous devices connected to the user device, such as touch screens, a presence-sensitive display, computer mice, keyboards, and other devices that permit the user to control the UI, and thus the application.

In an optimal scenario, the user would be able to effectively and efficiently use the UI to communicate such information; however, one or more factors may impose a limitation on the user's ability to do so. Thus, if operating under such a limitation, as the need to communicate more and more information grows, the ability to communicate this information effectively and efficiently may become restricted.

By way of example, for user devices with small screens, typing extensive amounts of text into the UI to communicate information to be used by an application may be very difficult, especially if the text is also difficult for the user to remember. Accordingly, it may be advantageous for the application to be able to remember this information as it would not have to be re-communicated the next time the application was to be employed by the user. It is plausible, however, that as the number of applications with which a user attempts to communicate grows, the burden imposed by using the UI to communicate extensive amounts of text to each of these applications (for the first time or otherwise) may burden the user. And, this may be true even if individual applications remember information entered by the user. As a result, users may become less engaged in these applications (or abandon their use altogether) once prompted to enter such information.

Some of these problems may be addressed through the use of methods, systems, and devices that allow the user of the user device to effectively and efficiently communicate information to be used by such applications by engaging the operating system of the user device to serve as an intermediary to facilitate autofill across multiple applications with the help of a remote provider. Specifically, in some examples, a user may use autofill at the operating system level of the user device by, in part, enabling autofill, allowing an authorized remote provider to provide data for autofill, retrieving autofill data, and saving autofill data for future use.

Furthermore, this use of a remote provider in helping facilitate autofill may provide several improvements for the user's experience when using autofill. For example, the user may enjoy increased security for the data she inputs (e.g., passwords, credit card numbers, etc.), because that data can be stored remotely by the remote provider, instead of locally on the user device. In another example, the user may enjoy increased convenience for further autofill uses, potentially across multiple devices, for the data she inputs (e.g., passwords, credit card numbers, etc.), because that data can be stored remotely by the remote provider, instead of locally on one user device. But, as detailed above, because the remote provider may not have access to the data the user may enter for future autofill uses until the user agrees to allow that data to be used for future autofill uses, it is difficult for the remote provider to provide the operating system with any insight or direction on the type, extent, and details of, or even how, the user-inputted data will be used for future autofill uses.

Thus, in such systems, another challenge that may diminish the user's inclination to engage with and utilize such autofill functionality would be a lack of specificity in what type or the extent of information that may be stored for future autofill uses. For example, if the user is presented with a generic autofill save prompt such as "Save <type> to <service>?," without knowing the details of the inputted data from the user, the <type> and <service> may only be set by the use of generic words like "password," "credit card," etc. Furthermore, this problem may be further complicated by the fact that the device may not support analyzing or saving this user-inputted data for one or more compelling reasons (e.g., it is personally identifiable information or "PII" and/or other sensitive information). And, the lack of analyzing or saving this user-inputted data by the device may present other analytical limitations for the device and/or unwanted experiences for the user (e.g., the device might show this generic save prompt even if the user has already elected to save the inputted data for future autofill uses (including this one), which can be annoying to the user). Additionally, this lack of analyzing or saving user-inputted data by the device may present challenges for other analytical components contributing to the user's autofill experience with the device (e.g., there may be limited validation by the device of the user-inputted data, so any affiliated autofill provider must handle any errors concerning this data upon receipt).

Moreover, these issues may not occur on other devices or platforms, which may not have the security constraints of a mobile device (e.g., the operating system may not comprehend the concept of a credit card and hence cannot infer its type based on any user-inputted number, whether it's valid, what icon should be displayed based on the issuing bank, etc.), as that information and logic may be offloaded from the mobile device (e.g., onto an affiliated autofill provider). Thus, when attempting to provide the user with an accurate approximation of the type, extent, and details of the user-inputted data that will be saved by the system for future autofill uses, there's a chicken-and-egg problem: the operating system of the mobile device can only infer that logic once it gets the user-inputted data via the text input fields entered by the user, but also cannot analyze, transmit, or store the data to provide an informed prompt before the user consents. Hence, there is a need to provide the user with accurate approximation of the type, extent, and details of the user-inputted data that will be used for future autofill uses without compromising this data.

Disclosed herein are example embodiments relating to methods, systems, and devices that allow the user of the user device to be apprised of the type, extent, and details of the user-inputted data that will be used for future autofill uses without compromising this data. Specifically, the example embodiments disclosed herein allow a user to be apprised, intelligently, of the data entered for future autofill uses at the operating system level of the user device by, in part, soliciting and receiving one or more templates for how user inputted data should be processed by the system, receiving the input of such data, processing and otherwise validating it in light of one or more templates the user device has received from an autofill provider, and generating and displaying a customized prompt to authorize transmission of this user-inputted data to the remote provider for future autofill uses.

By receiving the template(s) before any data has been inputted by a user, the operating system of a device may immediately display a customized prompt after the user input has been entered, without requiring any network communications. An alternative system may require transmission of the user inputted data to a remote provider to allow the remote provider to generate the customized prompt and transmit the customized prompt back to the device. However, such an alternative system may suffer from network delay before the customized prompt can be displayed to the user of the device, particularly if the user is in an area with poor network connectivity.

In an example embodiment, in accordance with the disclosure, an operating system, potentially of the user device, may receive authorization from the user to engage in autofill for an application displayed on the UI of the user device. For example, to enable autofill, the operating system may determine that a text input field is associated with a common autofill descriptor (e.g., the text input field is associated with a term such as "card #" or "Expiration Date"), and then prompt the user to set up autofill. In a further aspect, if the user only has one remote provider designated to help facilitate autofill, the user may be prompted to agree to use that remote provider; but if there are multiple remote providers designated, the user may be prompted to choose one or more remote providers. In either scenario, however, because engaging the operating system to perform autofill functions can involve sensitive and/or personal information specific to the user, the operating system may apprise the user of the details underlying the authorization of the autofill. These details may include accepting a detailed agreement concerning the operating system and/or a disclaimer associated with each remote provider, to inform the user and confirm her consent before authorizing the use of autofill with one or more of these remote providers.

In a further aspect, the operating system may also detect an event which triggers the operating system to examine the contents displayed on the UI. In example embodiments, this event may include: the initiation of the application; the selection of a text input field on the application; or a signal that a text input field has focus (e.g., a particular text field has become engaged such that a keyboard is displayed on the UI), among other illustrative examples.

In a further aspect, the operating system may also determine what portion of this content does not contain sensitive user-specific information.

In yet a further aspect, utilizing this portion of the content, the operating system may transmit a request to a remote provider to help facilitate autofill for the application by providing at least one template for use in the application. In this embodiment, such a request may be beneficial for the operating system and the user alike as it may allow the remote provider to securely and privately parse the content displayed on the UI to determine what information may be useful for facilitating autofill for the application (e.g., determining what text input fields on the application may be auto filled). In some embodiments, this request to the remote provider for the at least one template may be transmitted in response to an initiation of the application. In other embodiments, this request may be transmitted in response to a selection of a text input field of the application. In still other embodiments, this request may comprise metadata associated with the one or more text input fields.

Either way, once such a request has been sent to a remote provider, the operating system may receive a response to the request containing at least one temple indicating how to process user input data in one or more text input fields of the application displayed on the UI. Additionally, in further embodiments, a template may include at least one regular expression. In additional embodiments, a template may include a mapping between a plurality of values and a corresponding plurality of images, and the system may also determine an image for inclusion within the prompt based on the mapping and the one or more user input values. In further embodiments, a template may include a partial value mask, and the system may also determine a value for inclusion within the prompt by applying the partial value mask to one of the one or more user input values.

In another example, the template and/or the UI may be augmented if a condition associated with a given augmentation evaluates to true. For example, the remote provider may provide a template for a payment data which may be further customized based on a credit card type (e.g., for credit card type A a logo or associated graphic may be shown along with customized text in a customized prompt, but for credit card type B, only a logo or associated graphic may be shown in a customized prompt). In a further aspect, this is achieved by passing conditional customizations for the template where if the corresponding condition is met then the template may be further augmented with various types of input data. In a further aspect, after the template is augmented it may be populated via a list of transformations associated with each augmentation. For example, if the card is credit card type A, the operating system may insert the credit card type A specific UI elements and the use the associated transformations to populate these elements.

In further embodiments, the response may also contain a layout of a plurality of value holders and a corresponding plurality of transformations, and the system may determine a value for each value holder of the plurality of value holders by applying a corresponding transformation to at least one of the one or more user input values, wherein the prompt comprises the determined value for each value holder in the layout. In a further aspect, in some embodiments, this layout may comprise a string template.

Either way, once this response is received, the operating system may also receive one or more user input values in the one or more text input fields.

The operating system may generate a prompt to authorize transmission of the one or more user input values to the remote provider for future use in autofill, where the prompt is customized by processing the one or more user input values using the at least one template. In a further aspect, in some embodiments, this prompt may comprise an identifier of the remote provider. In a further aspect, in some embodiments, once the prompt is generated, the operating system may discard the at least one template after generating the prompt.

Once this prompt is generated, the operating system may also receive, via the prompt, authorization to transmit the one or more user input values to the remote provider. Then, in response to receiving the authorization, the operating system may transmit the one or more user input values to the remote provider.

In additional embodiments, the operating system may also validate the one or more user input values using the at least one template, and generate the prompt in response to successful validation (e.g., validation that a user has entered a correct number of digits for a credit card number). In other examples, however, if this validation is not successful, the operating system may not generate or display the prompt.

In further embodiments, the operating system may also determine whether the one or more user input values are valid based on the at least one template in response to each of a plurality of user input actions via the UI. The operating system may only generate the prompt upon a determination that the one or more user input values are valid. For example, each of the plurality of user input actions may be entry of a text character into one of the one or more text input fields.

In still other embodiments, the operating system may also determine whether a data set corresponding to the one or more user input values is already stored by the remote provider. The operating system may only generate the prompt upon a determination that the data set corresponding to the one or more user input values is not already stored by the remote provider. In a further aspect, in some embodiments, the operating system may determine whether the data set corresponding to the one or more user input values is already stored by the remote provider based on a list of data sets previously provided by the remote provider.

II. Distributed Computing Architecture

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

FIG. 1 depicts a distributed computing architecture 100 with server devices 108, 110 configured to communicate, via network 106, with user devices 104a, 104b, 104c, 104d, 104e, and remote providers 112 and 114, in accordance with example embodiments. Network 106 may correspond to a local area network (LAN), a wide area network (WAN), a corporate intranet, the public Internet, or any other type of network configured to provide communication paths between networked computing devices. Network 106 may also correspond to a combination of one or more LANs, WANs, corporate intranets, and/or the public Internet.

Although FIG. 1 only shows a small collection of user devices, distributed application architectures may serve tens, hundreds, or thousands of user devices. Moreover, user devices 104a, 104b, 104c, 104d, 104e (or any additional programmable devices) may be any sort of computing device capable of allowing a user to engage the operating system of the computing device to facilitate autofill across multiple applications with the help of a remote provider, such as an ordinary laptop computer, desktop computer, wearable computing device, mobile computing device, head-mountable device (HMD), network terminal, wireless communication device (e.g., a smartphone or cell phone), and so on. In some embodiments, such as indicated with user devices 104a, 104b, and 104c, user devices can be directly connected to network 106. In other embodiments, such as indicated with user devices 104d and 104e, user devices can be indirectly connected to network 106 via an associated computing device, such as user device 104c. In such embodiments, user device 104c can act as an associated computing device to pass electronic communications between user devices 104d and 104e and network 106. In still other embodiments not shown in FIG. 1, a user device can be both directly and indirectly connected to network 106.

Server devices 108, 110 may operate as part of a cloud-based server system that shares computer processing resources and data to computers and other devices on demand. In particular, server devices 108, 110 can be configured to perform one or more services requested by user devices 104a-104e. For example, server device 108 and/or 110 can provide content to user devices 104a-104e. In a further aspect, server device 108 and/or 110 may provide content to user devices 104a-104e directly or by facilitating the transmission of content requested from a third party. The content can include, but is not limited to, web pages, hypertext, scripts, binary data such as compiled software, images, audio, and/or video. The content can include compressed and/or uncompressed content. The content can be encrypted and/or unencrypted.

Remote providers 112, 114 may also operate as part of a cloud-based server system that shares computer processing resources and data to computers and other devices on demand. In particular, remote providers 112, 114 may provide, receive, store, manage, and transmit content on the network 106, in accordance with example embodiments. For example, remote provider 112 and/or 114 can receive a request for content to be used by user devices 104a-104e, and generate and transmit a response containing the content to devices connected to the network.

Within examples, server device 108 and/or 110 may provide content that facilitates autofill across multiple applications on user devices 104a-104e with the help of remote provider 112 and/or 114. Additionally, server device 108 and/or 110 can provide user devices 104a-104e with access to software for database, search, computation, graphical, audio, video, World Wide Web/Internet utilization, and/or other functions. Many other examples of content are possible as well.

III. Method Flowchart and Example Embodiments

Figure 2:
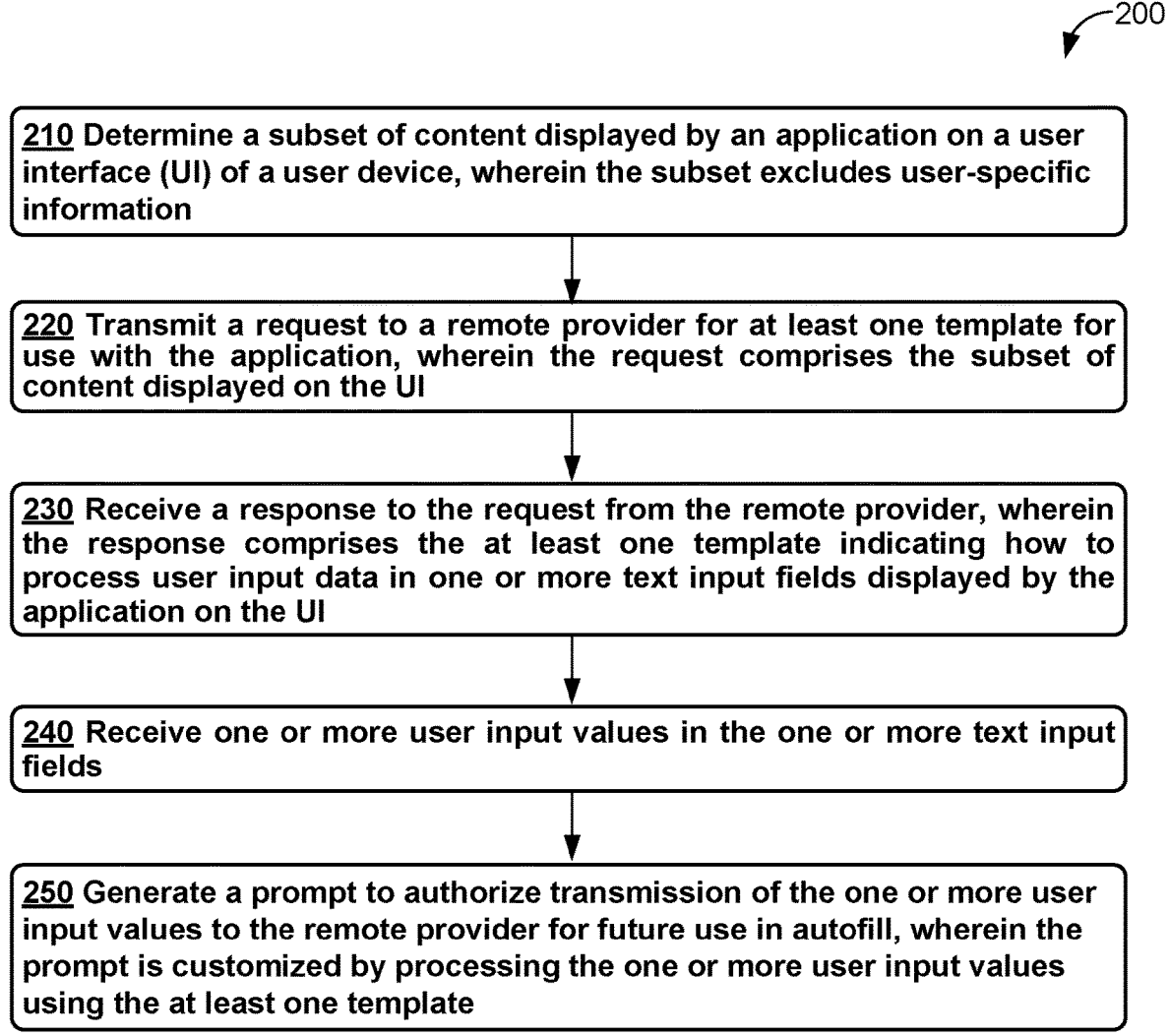
FIG. 2 is a flowchart of a method, in accordance with example embodiments.

FIG. 2 illustrates a flowchart showing a method 200 that may be performed to allow a user to engage the operating system of a user device to save user inputted data to facilitate future autofill across multiple applications with the help of a remote provider. Method 200 may be carried out by one or more computing devices, such as the user devices 104a-104e and remote provider 112 and/or 114, and in some instances server 108 and/or 110 as well, as illustrated and described with respect to FIG. 1. In additional examples, method 200 may be carried out by user devices 104a-104e and remote provider 112 and/or 114, and in some instances server 108 and/or 110 as well, operating as part of a cloud-based system. Additionally, method 200 may be performed by one or more other types of computing devices besides those specially illustrated in FIG. 1.

Additionally, although the steps of method 200 are described below as being completed by an operating system, other components, applications, and/or technologies related to the user device could perform the steps of method 200.

Furthermore, it is noted that the functionality described in connection with the flowcharts described herein can be implemented as special-function and/or configured general-function hardware modules, portions of program code executed by a processor for achieving specific logical functions, determinations, and/or steps described in connection with the flowchart shown in FIG. 2. Where used, program code can be stored on any type of computer-readable medium, for example, such as a storage device including a disk or hard drive.

In addition, each block of the flowchart shown in FIG. 2 may represent circuitry that is wired to perform the specific logical functions in the process. Unless specifically indicated, functions in the flowchart shown in FIG. 2 may be executed out of order from that shown or discussed, including substantially concurrent execution of separately described functions, or even in reverse order in some examples, depending on the functionality involved, so long as the overall functionality of the described method is maintained.

At block 210, method 200 may include determining a subset of content displayed by an application on a user interface (UI) of a user device, wherein the subset excludes user-specific information. In particular, a user may be interacting with a computing device and decide to interact with an application on that device. The operating system may recognize that the user is interacting with an application and that there is content that the operating system knows is relevant to autofilling the application. In accordance with this data, the operating system may then prompt the user to authorize the operating system to engage in autofill for the application, which may improve the user's interaction with, and/or the responsiveness of, user interface functionality.

In general, the operating system can recognize certain data that is commonly associated with autofill. In an example, the operating system may recognize that a text input field associated with an application contains or is associated with a common autofill descriptor (e.g., "card #" or "Expiration Date"). In response, in this example, the operating system may then prompt the user to set up autofill.

In some examples, before, after, or during the user's response to this prompt, the operating system may also compile a list of one or more remote providers to further aid in facilitating autofill. In one aspect, if there is only one remote provider designated to help facilitate autofill, the user may be prompted with an agreement to use that remote provider. In another aspect, however, if there are multiple remote providers designated to help facilitate autofill, then the user may be prompted to choose a remote provider and also prompted with an agreement to use that remote provider. In yet another aspect, the user may be allowed to choose more than one remote provider, but still may be prompted with an agreement to use each of the chosen remote providers.

In another example, the operating system may begin determining a subset of content displayed by an application on the UI due to the triggering of an event, perhaps an autofill trigger event. Autofill trigger events may provide information about the current state of the user device, or an application thereon, including the state of user's interaction with the device. Autofill trigger events may also be used to help the operating system know when to engage in authorized autofill at the right points in time. In some examples, autofill triggers events may be direct or indirect user interactions with the device. In general, once autofill is approved by the user, however, user interaction with the device may be monitored by the operating system.

In one embodiment, example autofill trigger events may be indicated by data associated with direct user interaction with the user device, such as a user's initiation of an application, a user's selection of a text input field of an application, or a request from the user to set up autofill for one or more applications, among other scenarios.

In other examples, the autofill trigger events may include data associated with indirect user interaction with the user device, such as a signal that an application has been initiated, or a signal that a text input field of the application, or some other parameter of content displayed on the UI of the user device, has focus, among other scenarios. In a further aspect, the user's indirect interaction with the user device may be reflected by a graphic or GUI, such as a keyboard, displayed on the UI In general, pursuant to any of these scenarios, the operating system may review sensitive and/or personal information when attempting to facilitating autofill, and it may be advantageous for the user to be informed of the details of this autofill before consenting to its use. Specifically, because the operating system may review content on the device containing sensitive and/or personal information, the operating system may inform the user of the details underlying the authorization of the autofill before engaging in autofill.

In a further aspect, because the chosen remote provider may receive some information that the user may not typically share, the user may also be prompted to approve an agreement containing the terms for using each of the autofill providers chosen by the user. In some examples, in order to ensure that the user fully understands the details for using these autofill providers, before authorizing the use of autofill, the user may be prompted with an agreement that may include a disclaimer for using the operating system and/or each of the autofill providers chosen by the user for autofill.

In still other examples, before authorizing the use of autofill, the user may be prompted with a verified transmission prompt authorizing the operating system to send one or more values entered into one or more text input fields displayed on the UI to a remote provider. For example, the user may have entered the one or more values into an application other than the one that served as the basis for the operating system's prompt for the user to set up autofill (a "second application"). In a further aspect, once authorized by the user to do so, the operating system may then transmit the one or more values to the remote provider for future use.

In general, the content displayed by an application on the UI refers to any information associated with an application that is ascertainable by the operating system. In one example, this content may include a current view hierarchy of the content displayed on the UI of the user device. Because, however, the content may also contain information that is sensitive and/or private, the operating system determines only a subset of the content which excludes the user-specific information.

In some examples, the user-specific information may include personally identifiable information, or any other information that can be used on its own or with other information to identify, contact, or locate a single person, or to identify an individual in the context of other information or data. In additional examples, the user-specific information may include information that the user has designated as sensitive and/or private.

In still other examples, the user-specific information may include information that has been designated as sensitive and/or private based on one or more factors associated with the user. For example, the user-specific information may include information that has been designated as sensitive and/or private based on the geographical region in which the user, the user device, and/or the remote provider, is located, among other possibilities. In other examples, the user-specific information may include information that has been designated as sensitive and/or private based on an attribute of the user (e.g., the user's age).

At block 220, method 200 further includes transmitting a request to a remote provider for at least one template for use with the application, wherein the request comprises the subset of content displayed on the UI. The request for a template may be sent to the remote provider selected to help facilitate the use of autofill on the user device. Specifically, based on the subset of displayed content excluding user-specific information, the operating system may send a request containing information within or associated with this subset of content to the remote provider to alert the remote provider of, amongst other things, potentially fillable fields displayed on the UI. In any event, this request may be beneficial for the operating system and the user alike as it may allow the remote provider to securely and privately parse the content displayed on the UI to determine what information may be useful for facilitating autofill for the application (e.g., determining what text input fields on the application may be autofilled).

In some examples, the request may include information associated with the text input fields displayed on the UI. In one aspect, this information may include one or more descriptors associated with the text input fields. For example, these descriptors may include terms such as "name," "username," "email," "password," "address," "city," "state," "zip code," "country," "account number," and/or "card number," among other possibilities.

In other examples, the request may include information associated with the current view hierarchy of the user device. In one aspect, this information may include information associated with compiling or maintaining the subset of content displayed on the UI (e.g., underlying script and/or code). In another aspect, this information may include information associated with certain approximations of the subset of content displayed on the UI (e.g, wireframe representations of the subset of content). In yet another aspect, this information may include information associated with the architecture of the subset of content displayed on the UI (e.g., information associated with the relative layout, linear layout, buttons, table layout, table rows, check boxes, and/or other elements).

Either way, the operating system may request a template for use with the application. In some examples, a template may be mechanism where the remote provider provides the business logic expressed in parcelable objects that are sent to the operating system, then the operating system feeds the user-provided data into these objects to infer the necessary business logic. For example, these templates may be used as part of the autofill process, and may be represented by one or more optional objects (e.g., a Validator template—used to validate credit card information (if it's not valid, the framework will not show a "save" prompt via UI); a Generator template—used to generate a credit card number (if such credit card was already saved for that service, the framework will not show a "save" prompt via UI); a Custom Presentation template—used to display a custom presentation which could have images, masked credit card numbers, expiration dates, texts with links, etc.).

Either way, in some examples, this request may be transmitted in response to an initiation of the application. In some examples, this request may be transmitted in response to a selection of a text input field of the application.

In still some other examples, this request may comprise metadata associated with the one or more text input fields. This metadata may be data or information that provides information about other data (e.g., descriptive metadata (which may describe a resource for purposes such as discovery and identification and can include elements such as title, abstract, author, and keywords), structural metadata (which may be about containers of data and indicates how compound objects are put together, for example, how pages are ordered to form chapters and describe the types, versions, relationships and other characteristics of digital materials and administrative metadata (which may provide information to help manage a resource, such as when and how it was created, file type and other technical information, and who can access it)).

At block 230, method 200 may further include receiving a response to the request from the remote provider, wherein the response comprises the at least one template indicating how to process user input data in one or more text input fields displayed by the application on the UI. In general, the response received from the remote provider may provide data (e.g., a template) that is helpful to the operating system in facilitating autofill.

In one example, the response may contain data helpful to the operating system in facilitating autofill in the first instance. For example, the response may contain the at least one template indicating how to process user input data in one or more text input fields displayed by the application on the UI.

In some examples, a template may include at least one regular expression. Here, a regular expression (sometimes called regex, regexp, or a rational expression) may be an object that describes a pattern of characters that can be used to perform pattern-matching and/or "search-and-replace" functions on user-inputted text. In a further aspect, the regular expressions may use any of a variety of different syntaxes or formats, such as those used in search engines, search and replace dialogs of word processors and text editors, in text processing utilities, and in lexical analysis. Additionally, many programming languages provide regular expression capabilities, built-in, or via libraries.

In some examples, a template may include a mapping between a plurality of values and a corresponding plurality of images, and the operating system may determine an image for inclusion within the prompt based on the mapping and the one or more user input values (e.g., to shown the credit card symbol of the credit card type entered by the user). Here, mapping may be the process of creating data element mappings between two distinct data models (which may be used as a first step for a wide variety of data integration tasks). The mapping itself may be created as a regular expression.

In some examples, a template may include a partial value mask, and the operating system may determine a value for inclusion within the prompt by applying the partial value mask to one of the one or more user input values (e.g., to only show the last four digits of a credit card number). Here, a value mask or partial value mask may include the application of a mask on an input field so the user can see only certain portions of the inputted data.

At block 240, method 200 may further include receiving one or more user input values in the one or more text input fields. The user input values may be received over a period of time as the user enters (e.g., types) individual characters, numbers, or words.

At block 250, method 200 may further include generating a prompt to authorize transmission of the one or more user input values to the remote provider for future use in autofill, where the prompt is customized by processing the one or more user input values using the at least one template. In some examples, the customized prompt may include details pertaining to the user inputted data that the remote provider does not yet have access to, but has nevertheless provided a template to aid the operating system in analyzing and applying to create the customized prompt. In some examples, this template may allow the operating system to generate a customized prompt to authorize transmission of the one or more user input values to the remote provider for future use in autofill (e.g., "Save Credit Card B to Autofill Provider X?") as opposed to a generic autofill save prompt such as ("Save <type> to <service>?," where, without knowing the details of the inputted data from the user, <type> and <service> may only be set by the use of generic words like "password," "credit card," etc.).

In a further aspect, in some embodiments, this prompt may comprise an identifier of the remote provider (e.g., an image specific to Credit Card B, Autofill Provider X, or both). In general, the identifier received from the remote provider may be associated with data inputted by the user corresponding to potentially fillable fields displayed on the UI. In a further aspect, displaying an identifier or identifiers associated with data inputted by the user may benefit the operating system and the user alike (as the user may select a displayed identifier to use the with data inputted by the user associated with that identifier instead of reviewing all of the available data when deciding which data the operating system should use for autofill).

In a further aspect, in some embodiments, once the prompt is generated, the operating system may discard the at least one template after generating the prompt. This discarding may be part of the regular workflow or process undertaken by the operating system and may provide advantageous results for the operating system (e.g., allowing the operating system to disregard any further processing of the user inputted data via the template, which may free resources for the operating system). The remote autofill provider may therefore be responsible for sending a new template each time an application is initiated and/or has run its course.

IV. Further Example Embodiments

In some examples, the methods described herein may further include, once this prompt is generated, the operating system receiving, via the prompt, authorization to transmit the one or more user input values to the remote provider. Then, in response to receiving the authorization, the operating system may also transmit the one or more user input values to the remote provider.

In some examples, the operating system may also validate the one or more user input values using the at least one template, and generate the prompt in response to successful validation (e.g., validation that a user has entered a correct number of digits for a credit card number, validation that a user has not entered the inputted data before (and thus no autofill prompt, generic or customized, should be created)).

In some examples, the operating system may also determine whether the one or more user input values are valid based on the at least one template in response to each of a plurality of user input actions via the UI. The operating system may only generate the prompt upon a determination that the one or more user input values are valid. For example, each of the plurality of user input actions may be entry of a text character into one of the one or more text input fields.

In some other example, the operating system may also determine whether a data set corresponding to the one or more user input values is already stored by the remote provider. The operating system may only generate the prompt upon a determination that the data set corresponding to the one or more user input values is not already stored by the remote provider. In a further aspect, in some examples, the operating system may determine whether the data set corresponding to the one or more user input values is already stored by the remote provider based on a list of data sets previously provided by the remote provider.

In another example, if there are multiple sets of input values to be used in autofill and associated identifiers, these identifiers may be displayed as a list of identifiers (in a drop-down menu or otherwise), each corresponding to a set of values, for the user's selection.

In yet another example, a fill indicator may also be displayed in the text input fields that could be filled with these values. Specifically, the fill indicator may allow the user to preview what text input fields will be autofilled with a particular set of values before engaging in autofill. Further, the fill indicator may be displayed in the form of a graphic generated by the operating system (e.g., a pencil graphic) or a specific graphic received from the remote provider or otherwise (e.g., a brand or graphic associated with the remote provider). Other illustrative examples are certainly possible.

Additionally, the methods described herein may further include receiving, by the operating system, input data indicating a selection of the data set identifier. In general, the receipt of the input data indicating the selection of a data set identifier may indicate to the operating system that the user is selecting the data set identifier and the values associated with that identifier for use in autofill.

V. Additional Explanatory Figures and Example Embodiments

Figure 3A:
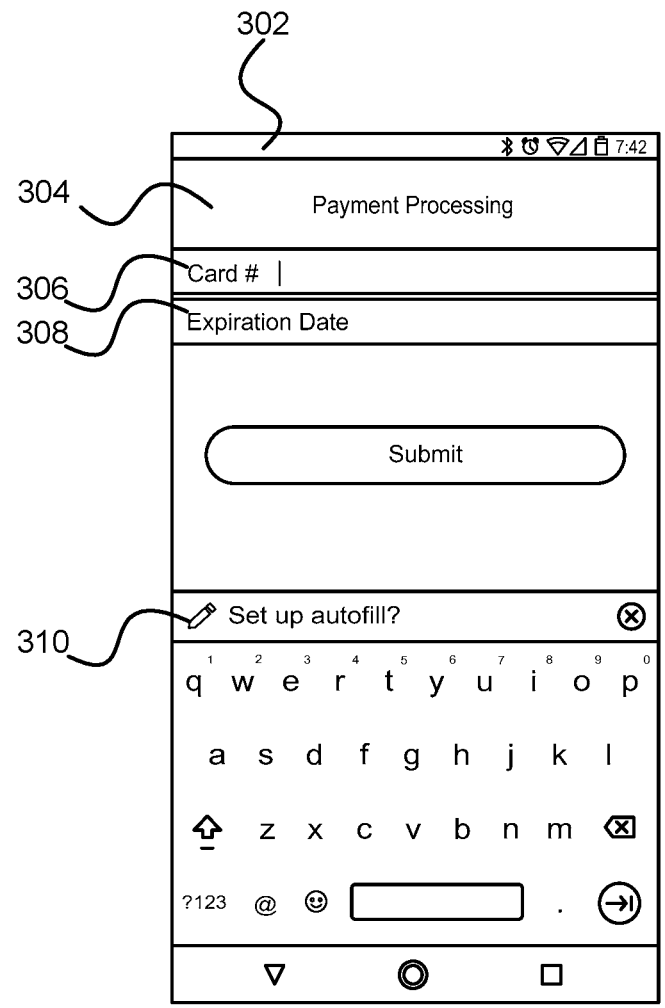
FIG. 3A illustrates a prompt for a user to set up autofill, in accordance with example embodiments.

FIG. 3A shows a prompt to set up autofill, in accordance with example embodiments. In particular, a user device 302 such as a cellular phone may display a portion of application 304 on the user device. The application 304 may also include text input fields containing or associated with common autofill descriptors 306 (e.g., "Card #") and/or 308 (e.g., "Expiration Date"). In this example, once the operating system of the user device 302 recognizes one or more common autofill descriptors 306 and/or 308, the operating system displays a prompt to set up autofill 310. In further examples, as discussed above, after selecting to setup autofill, the user may be prompted to select one or more remote providers to help facilitate autofill and may also be prompted to review and approve one or more agreements associated with the selected provider.

Figure 3B:
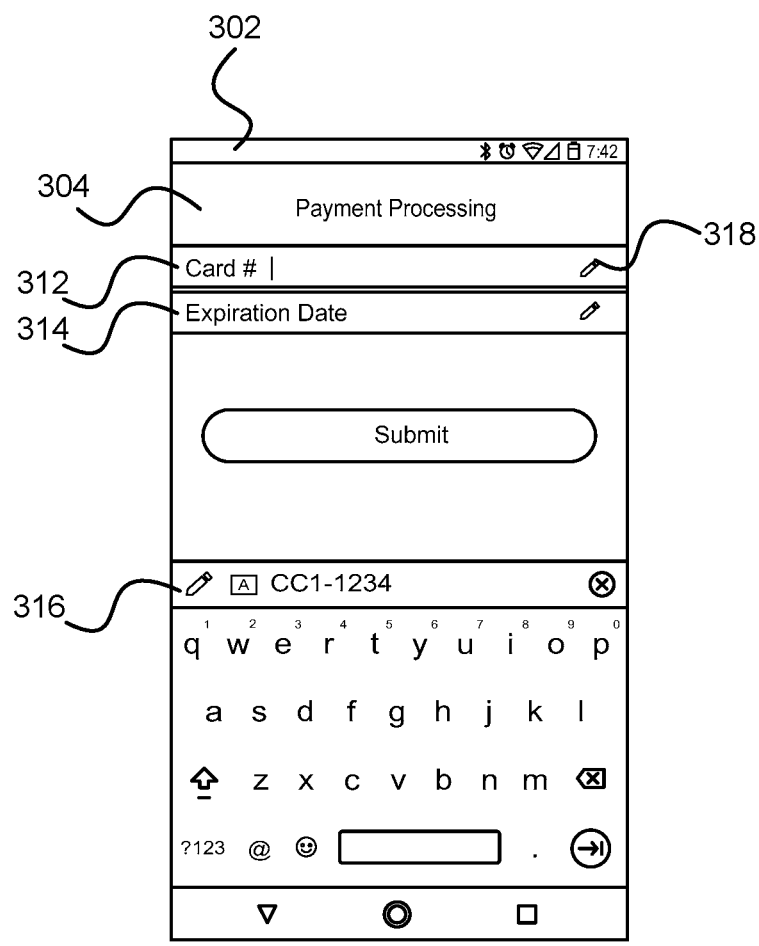
FIG. 3B illustrates a displayed data set identifier for selection via the UI of a user device, in accordance with example embodiments.

FIG. 3B shows a displayed data set identifier for selection via the UI of the user device, in accordance with example embodiments. In particular, a user device 302 such as a cellular phone may display a portion of application 304 on the user device. In this example, as described above, in response to a text input field of the application having some focus 312 (here, the "Card #" text input field has a vertical line indicating text can be typed into the field via the displayed keyboard) and those without such focus 314 (here, the "Expiration Date" text input field has no such vertical line) the operating system recognizes this focus, determines a subset of the content displayed on the UI that excludes user-specific information, transmits that a subset of content to the remote provider, and once the response from the remote provider is received, display, for the user's selection, the data set identifier 316 associated with previous user inputted values to be used in autofill. In further examples, the operating system may also display a fill indicator 318 (here, a pencil graphic) in the text input fields to be filled with the previously inputted user data.

Figure 3C:
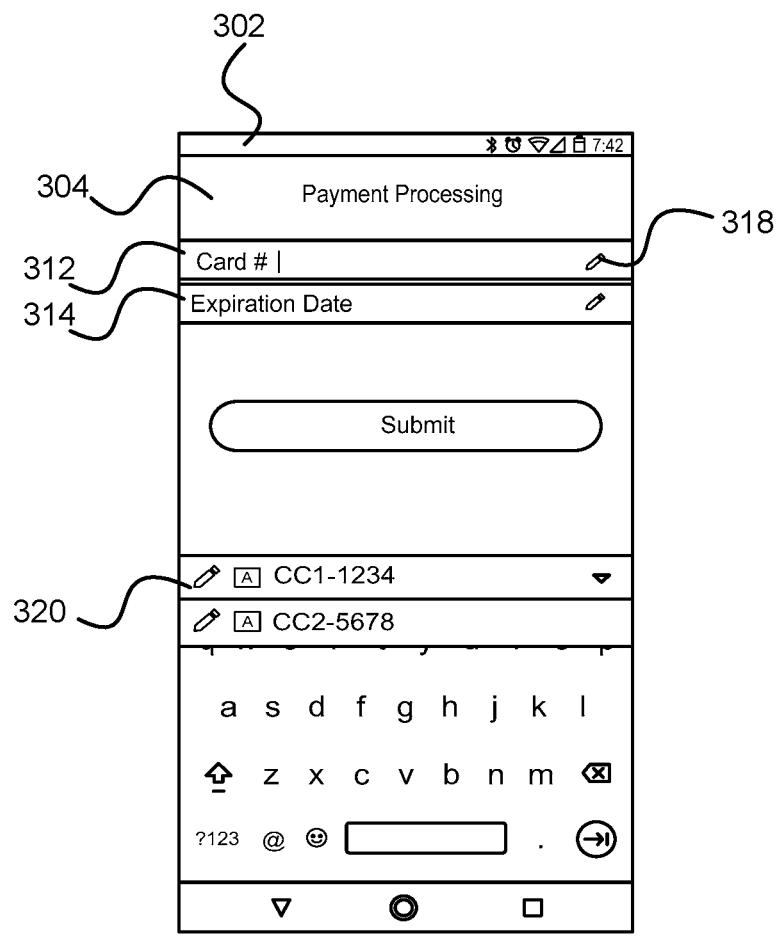
FIG. 3C illustrates a plurality of displayed data set identifiers for selection via the UI of a user device, in accordance with example embodiments.

FIG. 3C shows a plurality of displayed data set identifiers for selection via the UI of the user device, in accordance with example embodiments. Unlike the example embodiment in FIG. 3B, once the response from the remote provided is received, the operating system of the user device 302 displays, for the user's selection, a list of data set identifiers 320 associated with each set of previously inputted user data to potentially be used in autofill. In further examples, the operating system may also display a fill indicator 318 (here, a pencil graphic) in the text input fields to be filled with the user inputted data in a variety of ways. For example, in one aspect, the operating system may display a fill indicator 318 in the text input fields based on receiving a preselection of an identifier from the displayed list of identifiers. In another example, however, the operating system may display a fill indicator 318 in the text input fields that could be filled with the previously inputted user data associated with any of the identifiers from the displayed list of identifiers. Other illustrative examples are certainly possible.

Figures 4A, 4B:
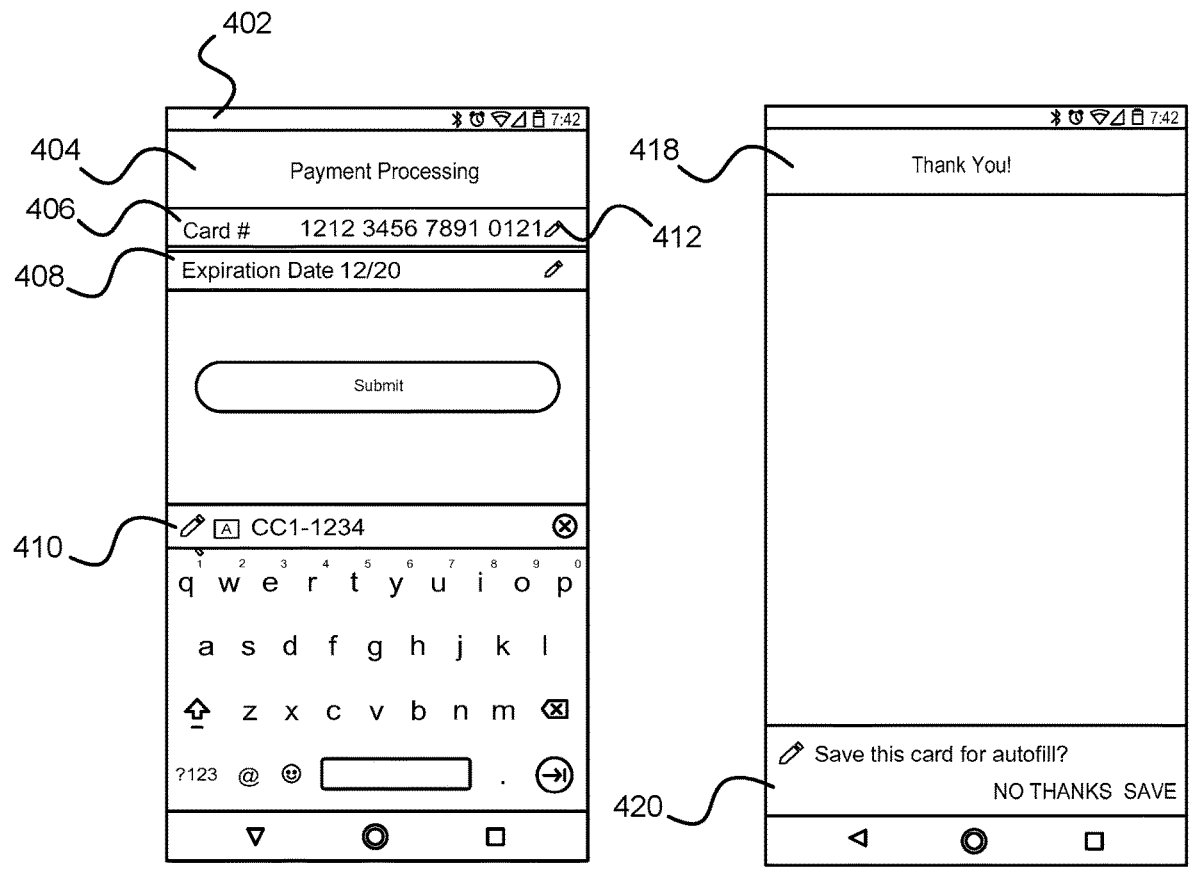
FIG. 4A shows user interface functionality associated with a user's manual entry of data into the text input fields of an application displayed on the UI, in accordance with example embodiments.
FIG. 4B illustrates a confirmation message and a generic data-save prompt associated with saving the user's manually entered data shown in FIG. 4A, in accordance with example embodiments.

FIG. 4A shows user interface functionality associated with a user's manual entry of data into the text input fields of an application displayed on the UI, in accordance with example embodiments. More specifically, a user device 402 such as a cellular phone may display a portion of application 404 on the user device. In this example, in spite of authorizing the operating system of the mobile to engage in autofill, the user may manually enter input data into a first text input field 406 (here, the "Card #" text input field) and a second text input field 408 (here, the "Expiration Date" text input field). In a further aspect, the user may manually enter this input data in spite of one or more displayed data set identifiers 410 associated with the previously inputted user data to be used in autofill and/or a displayed fill indicator 412 (here, a pencil graphic) in the text input field to be filled with this data. In another example embodiment, in response to a user manually entering input data into a text input field, the operating system may filter the displayed data set identifiers and/or the associated data to be used in autofill to limit the displayed data set identifiers and/or the associated data to be used in autofill to those that match or correspond to the input data being manually entered by the user. For example, if the user began manually entering a credit card that did not match any of the previously inputted user data, the operating system may filter out all of that data when determining what to display for autofill uses via the UI.

FIG. 4B illustrates a confirmation message and a generic data-save prompt associated with the user's manual input of data into the text input fields of the application displayed on the UI as shown in FIG. 4A, in accordance with example embodiments. Specifically, once the user has manually entered input data associated with the text input fields displayed on the UI, the operating system may generate and display a confirmation message 414 to apprise the user that the text input fields of the application displayed on the UI have been filled. In a further example, the operating system may also display a generic prompt 416 allowing the user to save the input data entered into the text input fields of the application, which may also include transmitting the input data to the selected remote provider for future autofill use. In a further aspect, the operating system may save the input data for future autofill uses by temporarily holding the data until the user responds to the prompt, at which point, the operating system may send the data to the remote provider. In another example, however, the operating system may disregard the user inputted data as soon as the data has been sent to the autofill provider.

Figures 4C, 4D:
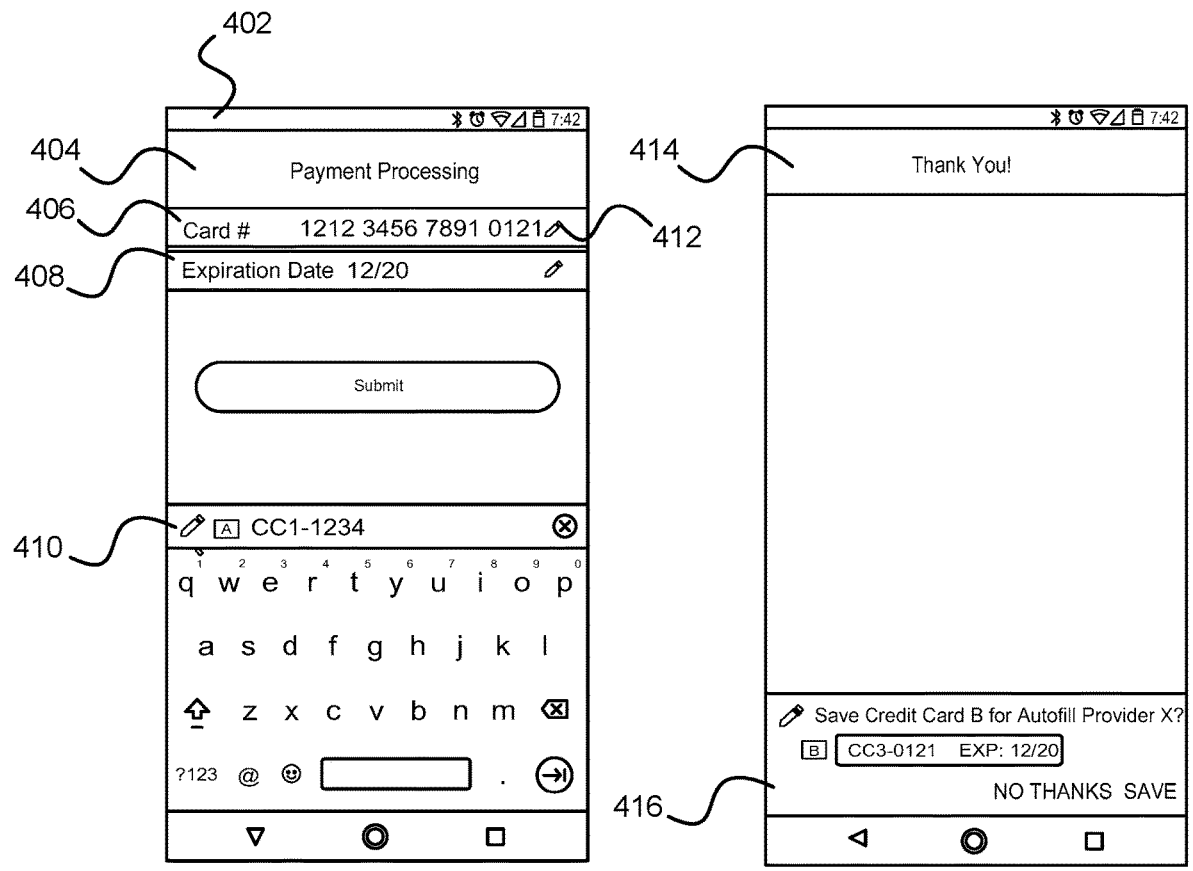
FIG. 4C shows user interface functionality associated with a user's manual entry of data into the text input fields of an application displayed on the UI, in accordance with example embodiments.
FIG. 4D illustrates a confirmation message and customized prompt associated with saving the user's manually entered data shown in FIG. 4C, in accordance with example embodiments.

Similar to FIG. 4A, FIG. 4C shows user interface functionality associated with a user's manual entry of data into the text input fields of an application displayed on the UI, except in accordance with other example embodiments. More specifically, a user device 402 such as a cellular phone may display a portion of application 404 on the user device. In this example, in spite of authorizing the operating system of the mobile to engage in autofill, the user may manually enter input data into a first text input field 406 (here, the "Card #" text input field) and a second text input field 408 (here, the "Expiration Date" text input field). In a further aspect, the user may manually enter this input data in spite of one or more displayed data set identifiers 410 associated with the previously inputted user data to be used in autofill and/or a displayed fill indicator 412 (here, a pencil graphic) in the text input field to be filled with this data.

FIG. 4D, unlike FIG. 4B, however, illustrates a confirmation message and a customized data-save prompt associated with the user's manual input of data into the text input fields of the application displayed on the UI as shown in FIG. 4C, in accordance with example embodiments. Specifically, once the user has manually entered input data associated with the text input fields displayed on the UI, the operating system may generate and display a confirmation message 418 to apprise the user that the text input fields of the application displayed on the UI have been filled.

In a further example, the operating system may also display a customized prompt 420 allowing the user to save the input data entered into the text input fields of the application, which may also include transmitting the input data to the selected remote provider for future autofill use. Here, as opposed to generic prompt 416, customized prompt 420 includes several customized aspects based on the user's manually inputted data. For example, these customized aspects may include: a customized identifier "B" (which may be associated with the credit card provider ((e.g., a credit card type A a logo or associated graphic may be shown along with customized text in a customized prompt), the remote provider, or both), a customized representation of the credit card's details (last four digits of the credit card number "-0121" and its expiration date "12/20") and its relationship to other previously-inputted credit cards "CC3-0121." Furthermore, these customized aspects may differ from previously generated aspects (e.g., for credit card type A a logo or associated graphic "A" (shown here in the context of 410), but for credit card type B, a logo or associated graphic "B" (shown here in the context of 416) may be shown along with customized text (shown here at 416, "Save Credit Card B for Autofill Provider X?") in a customized prompt).

In a further aspect, the operating system may save the input data for future autofill uses by temporarily holding the data until the user responds to the prompt, at which point, the operating system may send the data to the remote provider; or the operating system may disregard the user inputted data as soon as the data has been sent to the autofill provider.

Either way, to accomplish generation and display of a customized prompt 420 is no trivial task. The operating system may not comprehend the pertinent details or logic of manually inputted user data (e.g., the concept of a credit card, and hence cannot infer its type based on any user-inputted number, whether it's valid, what icon should be displayed based on the issuing bank, etc.). That information and logic may be offloaded from the mobile device (e.g., onto an affiliated remote autofill provider) to generate customized prompts.

Thus, when attempting to provide the user with an accurate approximation of the type, extent, and details of the user-inputted data that will be saved by the system for future autofill uses, there's a chicken-and-egg problem: the operating system of the mobile device can only infer that logic once it gets the user-inputted data via the text input fields entered by the user, but also cannot analyze, transmit, or store the data to provide an informed prompt before the user consents.

To provide the user with accurate approximation of the type, extent, and details of the user-inputted data that will be used for future autofill uses without compromising this data before the user consent, the operating system needs a way to provide this logic from the remote provider without exposing the user's manually inputted data (which may again be PII or secure information, for example a credit card number) before the user consents. Additionally, it may be advantageous for the operating system to do so, all while maintaining one or more predefined conditions (e.g., preserving security features of the existing save dialog with the user; letting the remote provider customize the save dialog, letting the remote provider transform the data before displaying, providing a way to not display the save dialog when certain information (for example, a credit card number) is already saved, not offering the option to save certain information (for example, a credit card number) if the form of the input data is invalid, etc.).

For example, the operating system of user device 402 may determine a subset of content displayed by application 404 (excluding user-specific information) and transmit a request to a remote provider for at least one template for use with application 404. This response from the remote provider may also contain at least one template indicating how to process user input data in one or more text input fields displayed by the application on the UI (e.g., text input field 406 (here, the "Card #" text input field) and/or text input field 408 (here, the "Expiration Date" text input field)).

In some examples, such templates may be mechanisms where the remote provider provides the business logic expressed in parcelable objects that are sent to the operating system, into which the operating system may feed the user-provided data to infer the necessary business logic. For example, these templates may be used as part of this process, and may be represented by one or more optional objects.

In any event, the operating system may need to extract the actual value of a input field displayed on the UI (e.g., in an autofill process), or some other content displayed on the UI, potentially through a ValueFinder. This ValueFinder may be needed to map the actual user input to the fields provided by the template (i.e., the template provided by the remote provider may have references to the id, and this function may get the actual value). For example, the operating system may use an interface to aid in this process such as:

```
public interface ValueFinder {
    AutofillValue findByAutofillId(AutofillId id);
}
```

In some examples, the template may be a Validator template, which may be used to validate the format of user-inputted data (e.g., credit card information). In some examples, the Validator template may be used to help the operating system evaluate if user-inputted data is not valid (e.g., an invalid credit card number). In some examples, if the inputted data is not valid, the operating will not show a prompt for the user to save the inputted data for future autofill uses at all, generic and customized alike (shown as 416 in FIG. 4B and 420 in FIG. 4D, respectively). Thus, the generation of a customized prompt is not interdependent on the validation template and logic, and vice versa.

To facilitate the effective use of this Validator template, the operating system may use a Validator interface such as:

```
public interface Validator extends Parcelable {
    boolean isValid (ValueFinder finder);
}
```

In a further aspect, the operating system may provide multiple implementations of the Validator interface, such as: CharSequenceValidator (which may validate the contents of a single view, based on a regular expression passed by the remote provider); LuhnChecksumValidator (which may validate whether the supplied identification may pass the Luhn algorithm); or Validators (which may provide methods to combine multiple validators using logical expressions (like AND and OR)), among other such possibilities.

Either way, when a SaveInfo object has a Validator and the operating system is ready to display a prompt, generic and customized alike (shown as 416 in FIG. 4B and 420 in FIG. 4D, respectively) via the UI, it will first feed the session data into the Validator and only show the prompt via the UI if isValid (session) returns true. To facilitate these example uses of this Validator template, the operating system may use the following exemplary code samples.

In the context of a naive validator that requires a credit card input field to have exactly 16 alpha-numeric digits:
saveBuilder.setValidator(new CharSequenceValidator-.Builder(ccNumberId, "^\\d{16}$").build( );

In the context of a validator that supports either 15 or 16 alpha-numeric digits:

```
import static android.service.autofill.Validators.or;
saveBuilder.setValidator(or(
    new CharSequenceValidator.Builder(ccNumberId, "^\\d{15}$").build( ),
    new CharSequenceValidator.Builder(ccNumberId, "^\\d{16}$").build( ))
));
```

In the context of a validator that supports either 15 or 16 alpha-numeric digits, but they must pass the Luhn algorithm:

```
import static android.service.autofill.Validators.or;
saveBuilder.setValidator(
    and (LuhnChecksumValidator.getInstance( ),
    or (new CharSequenceValidator.Builder(ccNumberId, "^\\d{15}$").build( ),
    new CharSequenceValidator.Builder(ccNumberId, "^\\d{16}$").build( ))
    )
));
```

In the context of a validator for a screen that stores the credit card number in 4 fields with 4 alpha-numeric digits each:

```
import static android.service.autofill.Validators.and;
saveBuilder.setValidator(and(
    new CharSequenceValidator.Builder(ccNumber1Id, "^\\d{4}$").build( )),
    new CharSequenceValidator.Builder(ccNumber2Id, "^\\d{4}$").build( )),
    new CharSequenceValidator.Builder(ccNumber3Id, "^\\d{4}$").build( )),
    new CharSequenceValidator.Builder(ccNumber4Id, "^\\d{4}$").build ( ))
));
```

In some examples, a template may be a Generator template, which may be used to generate a credit card number. The Generator template may be used to help determine if such a credit card was already saved for that service. If so, the operating system will not show a prompt for the user to save the inputted data for future autofill uses at all, generic and customized alike (shown as 416 in FIG. 4B and 420 in FIG. 4D, respectively). Thus, the generation of a customized prompt is not interdependent on the Generator template and logic, and vice versa.

In some examples, when the remote provider already has some user-inputted data, one or more identifiers may be displayed as a list of identifiers (in a drop-down menu or otherwise), each corresponding to a set of values and/or data, for the user's selection. The Generator template may be integrated with this identifier functionality as well as new, manually-inputted user data to compare or distinguish the two, solve this issue, among other methods (e.g., showing different inputted values and/or identifiers via the UI when the user input is slightly different (for example, if the remote provider sends the values "1234" via one or more templates and the user enters "1 2 3 4," these input values may render different results via the UI, or the same results, depending on the implementation).

In further examples, a template may be a CustomPresentation template, which may be used to display a custom presentation (e.g., a customized prompt) via the UI of user device 402. The CustomPresentation template may be used to display a custom presentation that may present images, masked credit card numbers, expiration dates, texts with links, and other such information to the user to apprise the user of the type, extent, and details of her inputted data that will be used for future autofill uses.

In some examples, the CustomPresentation object lets the remote provider define a RemoteViews template for the credit card title, and Transformation[s] that will be used to replace child views on that template by values inferred at runtime. In a further aspect, to facilitate the effective use of this CustomPresentation template, the operating system may use a Transformation interface such as:

```
public interface Transformation extends Parcelable {
    void apply (ValueFinder finder, RemoteViews parentTemplate, int childViewId);
}
```

In a further aspect, the operating system may provide multiple implementations of the Transformation interface, including: SingleViewCharSequenceTransformation (which may transform a single view in a string, using a regular expression and a group substitution, and may typically be used to mask a credit card number); MultipleViewsCharSequenceTransformation (which may transform multiple views in a string, using a regular expression and a group substitution, and may typically be used to generate the expiration date); CharSequenceTransformation (which may include some combination of SingleViewCharSequenceTransformation and MultipleViewsCharSequenceTransformation); or ImageTransformation (which may select an image based on which regexp match the view's value, and may typically used to select the proper credit card icon), among other such possibilities such as TextTransformation, which may be similar to ImageTransformation but may generate a text (like the credit card bank name) instead, among other such possibilities.

To facilitate these example uses of the CustomPresentation template, the operating system may use the following exemplary code samples, which use SingleViewCharSequenceTransformation, MultipleViewsCharSequenceTransformation, or ImageTransformationtransformations to generate a customized prompt (such as 420 in FIG. 4D).

In the context of defining the XML template for the remote view:

```
<LinearLayout>
    <ImageView android:id = " @+id/templateccLogo "/>
    <TextView android:id=" @+id/templateCcNumber "/>
    <TextView android:id = " @+id/templateExpDate "/>
</LinearLayout>
```

Then, in the context of defining the XML template for the remote view:

```
saveBuilder.setCustomPresentation (new CustomPresentation.Builder(presentation)
    .addChild (R.id.templateCcNumber,
```

```
        new SingleViewCharSequenceTransformation.Builder(
            ccNumberId, "^.*(\\d\\d\\d\\d)$", "...$1")
          . build( ))
    .addChild (R.id.templateExpDate,
        new MultipleViewsCharSequenceTransformation.Builder( )
          .addField (ccExpMonthId, "^(\\d\\d)$", "Exp: $1")
          .addField (ccExpYearId, "^(\\d\\d)$", "/$1")
          .build( ))
    .addChild (R.id.templateccLogo, new ImageTransformation.Builder(ccNumberId)
    .addOption ("^4815.*$", R.drawable.visa)
    .addOption ("^4816.*$", R.drawable.master_card)
    .build( ))
    .build( ));
```

In a further aspect, in some examples, the MultipleViews-CharSequenceTransformation may be replaced by StringTranformation, which may be accomplished by exemplary code samples such as:

```
        new StringFormatTransformation.Builder("Exp: %s/%s")
            .addArg(ccExpMonthId, "^(\\d\\d)$")
            .addArg(ccExpYearId, "^(\\d\\d)$")
            .build( ))
```

And, in a further aspect, this approach may present certain advantages (e.g., making the template more readable for the operating system). Other such examples are possible.

Illustrative documentation and sample code segments from another example implementation are provided below:
CharSequenceTransformation:

```
/**
 * Replaces a {@link TextView} child of a {@link CustomDescription} with the contents of one or
 * more regular expressions (regexs).
 *
 * <p>When it contains more than one field, the fields that match their regex are added to the
 * overall transformation result.
 *
 * <p>For example, a transformation to mask a credit card number contained in just one field would
 * be:
 *
 * <pre class="prettyprint">
 * new CharSequenceTransformation
 *         .Builder(ccNumberId, Pattern.compile("^.*(\\d\\d\\d\\d)$"), "...$1")
 *         .build( );
 * </pre>
 *
 * <p>But a transformation that generates a {@code Exp: MM / YYYY} credit expiration date from two
 * fields (month and year) would be:
 *
 * <pre class="prettyprint">
 * new CharSequenceTransformation
 *         .Builder(ccExpMonthId, Pattern.compile("^(\\d\\d)$"), "Exp: $1")
 *         .addField(ccExpYearId, Pattern.compile("^(\\d\\d\\d\\d)$"), " / $1");
 * </pre>
 */
CustomDescription:
/**
 * Defines a custom description for the Save UI affordance.
 *
 * <p>This is useful when the autofill service needs to show a detailed view of what would be saved;
 * for example, when the screen contains a credit card, it could display a logo of the credit card
 * bank, the last four digits of the credit card number, and its expiration number.
 *
 * <p>A custom description is made of 2 parts:
 * <ul>
```

```
 *         <li>A {@link RemoteViews presentation template} containing children views.
 *         <li>{@link Transformation Transformations} to populate the children views.
 * </ul>
 *
 * <p>For the credit card example mentioned above, the (simplified) template would be:
 *
 * <pre class="prettyprint">
 * <LinearLayout>
 *         <ImageView android:id="@+id/templateccLogo"/>
 *         <TextView android:id="@+id/templateCcNumber"/>
 *         <TextView android:id="@+id/templateExpDate"/>
 * </LinearLayout>
 * </pre>
 *
 * <p>Which in code translates to:
 *
 * <pre class="prettyprint">
 *         CustomDescription.Builder buider = new Builder(new RemoteViews(pgkName,
R.layout.cc_template);
 * </pre>
 *
 * <p>Then the value of each of the 3 children would be changed at runtime based on the
the value of
 * the screen fields and the {@link Transformation Transformations}:
 *
 * <pre class="prettyprint">
 * // Image child - different logo for each bank, based on credit card prefix
 * builder.addChild(R.id.templateccLogo,
 *         new ImageTransformation.Builder(ccNumberId)
 *             .addOption(Pattern.compile("^4815.*$"), R.drawable.ic_credit_card_logo1)
 *             .addOption(Pattern.compile("^1623.*$"), R.drawable.ic_credit_card_logo2)
 *             .addOption(Pattern.compile("^42.*$"), R.drawable.ic_credit_card_logo3)
 *             .build( );
 * // Masked credit card number (as .....LAST_4_DIGITS)
 * builder.addChild(R.id.templateCcNumber, new CharSequenceTransformation
 *             .Builder(ccNumberId, Pattern.compile("^.*(\\d\\d\\d\\d)$"), "...$1")
 *             .build( );
 * // Expiration date as MM / YYYY:
 * builder.addChild(R.id.templateExpDate, new CharSequenceTransformation
 *             .Builder(ccExpMonthId, Pattern.compile("^(\\d\\d)$"), "Exp: $1")
 *             .addField(ccExpYearId, Pattern.compile("^(\\d\\d)$"), "/$1")
 *             .build( );
 * </pre>
 *
 * <p>See {@link ImageTransformation}, {@link CharSequenceTransformation} for
more info about these
 * transformations.
 */
ImageTransformation:
/**
 * Replaces the content of a child {@link ImageView} of a
 * {@link RemoteViews presentation template} with the first image that matches a
regular expression
 * (regex).
 *
 * <p>Typically used to display credit card logos. Example:
 *
 * <pre class="prettyprint">
 *         new ImageTransformation.Builder(ccNumberId, Pattern.compile("^4815.*$"),
 *                            R.drawable.ic_credit_card_logo1, "Brand 1")
 *             .addOption(Pattern.compile("^1623.*$"), R.drawable.ic_credit_card_logo2, "Brand 2")
 *             .addOption(Pattern.compile("^42.*$"), R.drawable.ic_credit_card_logo3, "Brand 3")
 *             .build( );
 * </pre>
 *
 * <p>There is no imposed limit in the number of options, but keep in mind that regexs
are
 * expensive to evaluate, so use the minimum number of regexs and add the most common
first
 * (for example, if this is a tranformation for a credit card logo and the most common
credit card
 * issuers are banks X and Y, add the regexes that resolves these 2 banks first).
 */
Validator:
/**
         * Sets an object used to validate the user input - if the input is not valid, the
         * autofill save UI is not shown.
         *
```

```
* <p>Typically used to validate credit card numbers. Examples:
*
* <p>Validator for a credit number that must have exactly 16 digits:
*
* <pre class="prettyprint">
* Validator validator = new RegexValidator(ccNumberId,
Pattern.compile("^\\d{16}$"))
* </pre>
*
* <p>Validator for a credit number that must pass a Luhn checksum and either have
* 16 digits, or 15 digits starting with 108:
*
* <pre class="prettyprint">
* import android.service.autofill.Validators;
*
* Validator validator =
*         and(
*                 new LuhnChecksumValidator(ccNumberId),
*                 or(
*                         new RegexValidator(ccNumberId, Pattern.compile("^\\d{16}$")),
*                         new RegexValidator(ccNumberId, Pattern.compile("^108\\d{12}$"))
*                 )
*         );
* </pre>
*
* <p><b>Note:</b> the example above is just for illustrative purposes; the same validator
* could be created using a single regex for the {@code OR} part:
*
* <pre class="prettyprint">
* Validator validator =
*         and(
*                 new LuhnChecksumValidator(ccNumberId),
*                 new RegexValidator(ccNumberId,
Pattern.compile("^(\\d{16}|108\\d{12})$"))
*         );
* </pre>
*
* <p>Validator for a credit number contained in just 4 fields and that must have exactly
* 4 digits on each field:
*
* <pre class="prettyprint">
* import android.service.autofill.Validators;
*
* Validator validator =
*         and(
*                 new RegexValidator(ccNumberId1, Pattern.compile("^\\d{4}$")),
*                 new RegexValidator(ccNumberId2, Pattern.compile("^\\d{4}$")),
*                 new RegexValidator(ccNumberId3, Pattern.compile("^\\d{4}$")),
*                 new RegexValidator(ccNumberId4, Pattern.compile("^\\d{4}$"))
*         );
* </pre>
*
* @param validator an implementation provided by the Android System.
* @return this builder.
*
* @throws IllegalArgumentException if {@code validator} is not a class provided
* by the Android System.
*
```

VI. Computing Device

Figure 5:
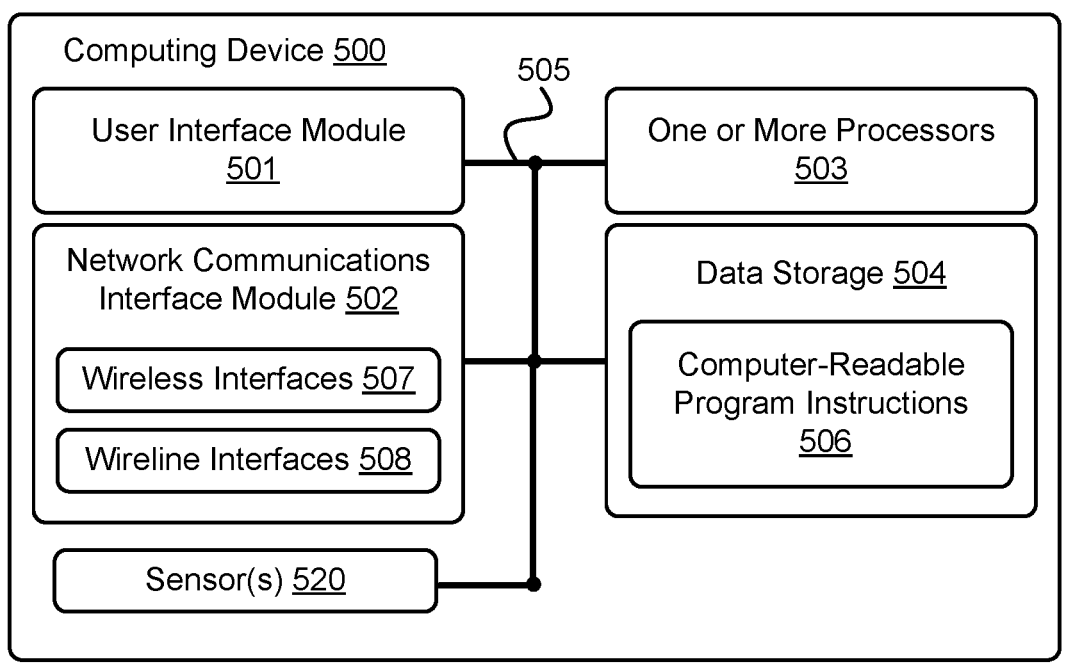
FIG. 5 is a functional block diagram of an example computing device, in accordance with example embodiments.

In reference now to FIG. 5, FIG. 5 is a functional block diagram of computing device 500, in accordance with example embodiments. In particular, computing device 500 shown in FIG. 5 can be configured to perform at least one function of server device 108 and/or 110, and/or remote provider 112 and/or 114, any of user device 104a-104e, method 200, user device 302, and/or user device 402 as previously described.

Computing device 500 may include a user interface module 501, a network-communication interface module 502, one or more processors 503, data storage 504, and one or more sensors 520, all of which may be linked together via a system bus, network, or other connection mechanism 505.

User interface module 501 can be operable to send data to and/or receive data from external user input/output devices. For example, user interface module 501 can be configured to send and/or receive data to and/or from user input devices such as a keyboard, a keypad, a touch screen, a presence-sensitive display, a computer mouse, a track ball, a joystick, a camera, a voice recognition module, and/or other similar devices. User interface module 501 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 501 can also be configured to generate audible output(s), such as a speaker, speaker jack, audio output port, audio output device, earphones, and/or other similar devices. User interface module 501 can further be configured with one or more haptic devices that can generate haptic output(s), such as vibrations and/or other outputs detectable by touch and/or physical contact with computing device 500. In some embodiments, user interface module 501 can be used to provide a GUI for utilizing computing device 500.

Network-communications interface module 502 can include one or more wireless interfaces 507 and/or one or more wireline interfaces 508 that are configurable to communicate via a network. Wireless interfaces 507 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 508 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 502 can be configured to provide reliable, secured, and/or authenticated communications. For each communication, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

One or more processors 503 can include one or more general purpose processors, and/or one or more special purpose processors (e.g., digital signal processors, graphics processing units, application specific integrated circuits, etc.). One or more processors 503 can be configured to execute computer-readable program instructions 506 that are contained in data storage 504 and/or other instructions as described herein.

Data storage 504 can include one or more computer-readable storage media that can be read and/or accessed by at least one of one or more processors 503. The one or more computer-readable storage media can include volatile and/or non-volatile storage components, such as optical, magnetic, organic or other memory or disc storage, which can be integrated in whole or in part with at least one of one or more processors 503. In some embodiments, data storage 504 can be implemented using a single physical device (e.g., one optical, magnetic, organic or other memory or disc storage unit), while in other embodiments, data storage 504 can be implemented using two or more physical devices.

Data storage 504 can include computer-readable program instructions 506 and perhaps additional data. In some embodiments, data storage 504 can additionally include storage required to perform at least part of the herein-described methods, scenarios, and techniques and/or at least part of the functionality of the herein-described devices and networks.

In some embodiments, computing device 500 can include one or more sensors 520. Sensor(s) 520 can be configured to measure conditions in an environment of computing device 500 and provide data about that environment. For example, sensor(s) 520 can include one or more of: (i) an identification sensor to identify other objects and/or devices, such as, but not limited to, an RFID reader, proximity sensor, one-dimensional barcode reader, two-dimensional barcode (e.g., Quick Response (QR) code) reader, and a laser tracker, where the identification sensor(s) can be configured to read identifiers, such as RFID tags, barcodes, QR codes, and/or other devices and/or object configured to be read and provide at least identifying information; (ii) sensors to measure locations and/or movements of computing device 500, such as, but not limited to, a tilt sensor, a gyroscope, an accelerometer, a Doppler sensor, a Global Positioning System (GPS) device, a sonar sensor, a radar device, a laser-displacement sensor, and a compass; (iii) an environmental sensor to obtain data indicative of an environment of computing device 500, such as, but not limited to, an infrared sensor, an optical sensor, a light sensor, a camera, a biosensor, a biometric sensor, a capacitive sensor, a touch sensor, a temperature sensor, a wireless sensor, a radio sensor, a movement sensor, a microphone, a sound sensor, an ultrasound sensor, and/or a smoke sensor; and (iv) a force sensor to measure one or more forces (e.g., inertial forces and/or G-forces) acting about computing device 500, such as, but not limited to one or more sensors that measure: forces in one or more dimensions, torque, ground force, friction, and/or a zero moment point (ZMP) sensor that identifies ZMPs and/or locations of the ZMPs. Many other examples of sensor(s) 520 are possible as well.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are provided for explanatory purposes and are not intended to be limiting, with the true scope being indicated by the following claims.

What is claimed is:

1. A method comprising:
    determining a subset of content displayed by an application on a user interface (UI) of a user device, wherein the subset excludes user-specific information;
    transmitting a request to a remote provider for at least one template for use with the application, wherein the request comprises the subset of content displayed on the UI, wherein the at least one template comprises a partial value mask;
    receiving a response to the request from the remote provider, wherein the response comprises the at least one template specifying a prompt format and specifying one or more text input fields, wherein one or more user input values are to be extracted from the one or more specified text input fields and included within the specified prompt format;
    extracting the one or more user input values from the one or more specified text input fields;
    determining a value for inclusion within a prompt by applying the partial value mask to one of the one or more user input values;
    generating, based on the at least one template, the prompt to authorize transmission of the one or more user input values to the remote provider for future use in autofill, wherein the prompt is customized in the prompt format, wherein the prompt includes one or more portions of the extracted one or more user input values from the one or more specified text input fields;
    receiving, via the prompt, authorization to transmit the one or more user input values to the remote provider; and
    in response to receiving the authorization, transmitting the one or more user input values to the remote provider which provided the at least one template.

2. The method of claim 1, further comprising:
    validating the one or more user input values using the at least one template, and wherein generating the prompt is performed in response to the validating.

3. The method of claim 1, further comprising:
    determining whether the one or more user input values are valid based on the at least one template in response to each of a plurality of user input actions via the UI, and wherein generating the prompt is performed only upon a determination that the one or more user input values are valid.

4. The method of claim 3, wherein each of the plurality of user input actions comprises entry of a text character into one of the one or more specified text input fields.

5. The method of claim 1, wherein the at least one template comprises at least one regular expression.

6. The method of claim 1, wherein the response comprises a layout of a plurality of value holders and a corresponding plurality of transformations, the method further comprising:
    determining a value for each value holder of the plurality of value holders by applying a corresponding transformation to at least one of the one or more user input values, wherein the prompt comprises the determined value for each value holder in the layout.

7. The method of claim 6, wherein the layout comprises a string template.

8. The method of claim 1, wherein the at least one template comprises a mapping between a plurality of values and a corresponding plurality of images, the method further comprising:
    determining an image for inclusion within the prompt based on the mapping and the one or more user input values.

9. The method of claim 1, wherein the request to the remote provider for the at least one template is transmitted in response to an initiation of the application.

10. The method of claim 1, wherein the request to the remote provider for the at least one template is transmitted in response to a selection of a text input field of the application.

11. The method of claim 1, wherein the request comprises metadata associated with the one or more specified text input fields.

12. The method of claim 1, further comprising discarding the at least one template after generating the prompt.

13. The method of claim 1, further comprising determining whether a data set corresponding to the one or more user input values is already stored by the remote provider, and wherein generating the prompt is performed only upon a determination that the data set corresponding to the one or more user input values is not already stored by the remote provider.

14. The method of claim 13, wherein determining whether the data set corresponding to the one or more user input values is already stored by the remote provider is based on a list of data sets previously provided by the remote provider.

15. The method of claim 1, wherein the prompt further comprises an identifier of the remote provider.

16. The method of claim 1, wherein the method is performed by an operating system of the user device.

17. The method of claim 1, wherein the remote provider is a given remote provider from multiple remote providers, wherein the method further comprises:
   displaying a second prompt that includes an option to select from the multiple remote providers; and
   receiving, via the second prompt, a selection indicating the given remote provider.

18. A non-transitory computer readable medium having stored therein instructions executable by one or more processors to cause the one or more processors to perform functions comprising:
   determining a subset of content displayed by an application on a user interface (UI) of a user device, wherein the subset excludes user-specific information;
   transmitting a request to a remote provider for at least one template for use with the application, wherein the request comprises the subset of content displayed on the UI, wherein the at least one template comprises a partial value mask;
   receiving a response to the request from the remote provider, wherein the response comprises the at least one template specifying a prompt format and specifying one or more text input fields, wherein one or more user input values are to be extracted from the one or more specified text input fields and included within the specified prompt format;
   extracting the one or more user input values from the one or more specified text input fields;
   determining a value for inclusion within a prompt by applying the partial value mask to one of the one or more user input values;
   generating, based on the at least one template, the prompt to authorize transmission of the one or more user input values to the remote provider for future use in autofill, wherein the prompt is customized in the prompt format, wherein the prompt includes one or more portions of the extracted one or more user input values from the one or more specified text input fields;
   receiving, via the prompt, authorization to transmit the one or more user input values to the remote provider; and
   in response to receiving the authorization, transmitting the one or more user input values to the remote provider which provided the at least one template.

19. A user device comprising:
   one or more processors;
   a user interface (UI); and
   an operating system configured to:
      determine a subset of content displayed by an application on the UI of the user device, wherein the subset excludes user-specific information;
      transmit a request to a remote provider for at least one template for use with the application, wherein the request comprises the subset of content displayed on the UI;
      receive a response to the request from the remote provider, wherein the response comprises the at least one template specifying a prompt format and specifying one or more text input fields, wherein one or more user input values are to be extracted from the one or more specified text input fields and included within the specified prompt format, wherein the at least one template comprises a mapping between a plurality of values and a corresponding plurality of images;
      extract the one or more user input values from the one or more specified text input fields;
      determine an image for inclusion within a prompt based on the mapping and the one or more user input values;
      generate, based on the at least one template, the prompt to authorize transmission of the one or more user input values to the remote provider for future use in autofill, wherein the prompt is customized in the prompt format, wherein the prompt includes one or more portions of the extracted one or more user input values from the one or more specified text input fields;
      receive, via the prompt, authorization to transmit the one or more user input values to the remote provider; and
      in response to receiving the authorization, transmit the one or more user input values to the remote provider which provided the at least one template.

* * * * *